(12) United States Patent
Long et al.

(10) Patent No.: US 11,293,525 B2
(45) Date of Patent: Apr. 5, 2022

(54) SEVEN-SPEED DOUBLE CLUTCH TRANSMISSION AND VEHICLE

(71) Applicant: Guangzhou Automobile Group Co., Ltd., Guangdong (CN)

(72) Inventors: Yushi Long, Guangdong (CN); Bo Huang, Guangdong (CN); Xiaoming Ling, Guangdong (CN); You Zhou, Guangdong (CN); Xuewu Liu, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 0 days.

(21) Appl. No.: 16/327,865

(22) PCT Filed: Jul. 13, 2018

(86) PCT No.: PCT/CN2018/095552
§ 371 (c)(1),
(2) Date: Feb. 25, 2019

(87) PCT Pub. No.: WO2019/184145
PCT Pub. Date: Oct. 3, 2019

(65) Prior Publication Data
US 2021/0324943 A1    Oct. 21, 2021

(30) Foreign Application Priority Data
Mar. 30, 2018   (CN) .......................... 201810292374.3

(51) Int. Cl.
*F16H 3/08*    (2006.01)
*F16H 3/085*   (2006.01)
(Continued)

(52) U.S. Cl.
CPC ............. *F16H 3/085* (2013.01); *F16D 21/00* (2013.01); *F16H 37/043* (2013.01);
(Continued)

(58) Field of Classification Search
None
See application file for complete search history.

(56) References Cited

U.S. PATENT DOCUMENTS

| 6,250,171 B1* | 6/2001 | Sperber | F16H 3/006 |
| | | | 74/331 |
| 7,004,044 B2* | 2/2006 | Hosono | F16H 3/006 |
| | | | 74/331 |

(Continued)

FOREIGN PATENT DOCUMENTS

| CN | 103363031 A | 10/2013 |
| CN | 103363032 A | 10/2013 |

(Continued)

*Primary Examiner* — Dirk Wright
(74) *Attorney, Agent, or Firm* — ScienBiziP, P.C.

(57) ABSTRACT

Provided are a seven-speed double clutch transmission and a vehicle. The seven-speed double clutch transmission includes: an outer input shaft and an inner input shaft, a 4/6-speed driving gear and a 2-speed driving gear are sequentially fixed on the outer input shaft, and a 1-speed driving gear, a 3-speed driving gear and a 5/7-speed driving gear are sequentially fixed on the inner input shaft; a first output shaft and a second output shaft, a 4-speed driven gear, a 2-speed driven gear, a 1-speed driven gear and a 5-speed driven gear, are sequentially fixed on the first output shaft, and a 6-speed driven gear, a reverse gear, a reverse gear synchronizer, a 3-speed driven gear and a 7-speed driven gear are sequentially fixed on the second output shaft.

18 Claims, 2 Drawing Sheets

(51) Int. Cl.
*F16D 21/00* (2006.01)
*F16H 37/04* (2006.01)
*F16H 57/021* (2012.01)
*F16H 57/023* (2012.01)
*F16H 57/04* (2010.01)

(52) U.S. Cl.
CPC ......... *F16H 57/021* (2013.01); *F16H 57/023* (2013.01); *F16H 57/043* (2013.01); *F16H 57/0471* (2013.01); F16H 2003/0822 (2013.01); F16H 2200/0056 (2013.01); F16H 2306/48 (2013.01); F16H 2702/04 (2013.01)

(56) References Cited

U.S. PATENT DOCUMENTS

| | | | | |
|---|---|---|---|---|
| 8,336,410 | B2 * | 12/2012 | Ross | F16H 3/006 74/330 |
| 8,336,411 | B2 * | 12/2012 | Ross | F16H 3/006 74/330 |
| 8,408,085 | B2 * | 4/2013 | Sowul | F16H 3/006 74/330 |
| 8,464,599 | B2 * | 6/2013 | Ross | F16H 3/006 74/330 |
| 8,495,926 | B2 * | 7/2013 | Mellet | F16H 3/006 74/331 |
| 8,528,431 | B2 * | 9/2013 | Ross | F16H 3/006 74/330 |
| 8,707,813 | B2 * | 4/2014 | Pfannkuchen | F16H 3/006 74/331 |
| 10,018,251 | B2 * | 7/2018 | Singh | F16H 3/093 |

FOREIGN PATENT DOCUMENTS

| | | | | |
|---|---|---|---|---|
| CN | 203463567 U | | 3/2014 | |
| CN | 203463570 U | | 3/2014 | |
| CN | 207999480 U | | 10/2018 | |
| JP | 2007321821 A | * | 12/2007 | ............ F16H 3/006 |
| KR | 20170069741 A | | 6/2017 | |
| WO | WO-2006040060 A1 | * | 4/2006 | ............ F16H 3/006 |

* cited by examiner

SEVEN-SPEED DOUBLE CLUTCH TRANSMISSION AND VEHICLE

TECHNICAL FIELD

The present disclosure belongs to the technical field of vehicle transmissions, and more particularly to a seven-speed double clutch transmission.

BACKGROUND

A double clutch transmission integrates two gearboxes and two clutches into one transmission housing. Two inner and outer input shafts that are rotatably sleeved together are respectively connected to one of the clutches, the two input shafts respectively transmit the power of the two gearbox speed groups, and a shifting program is completed by automatically switching between the two clutches, so that the power continuity during the shifting process can be realized, that is, the power is not interrupted during the shifting process. The disadvantages of AMT shifting shock are overcome, during the shifting process, the power of an engine can always be transmitted to wheels, and shifting is smooth and stable, which not only ensures the acceleration of a vehicle, but also improves the comfort of vehicle running because the vehicle no longer produces sharp deceleration due to shifting.

According to the existing seven-gear double clutch transmission, low-speed gears are often placed near the rear end of the transmission during gear arrangement. This requires a large space at the rear end of the transmission housing to accommodate a low-speed driven gear, which is not conducive to the arrangement of stringers and axle shafts of the entire vehicle.

Moreover, during the shafting arrangement of the existing seven-gear double clutch transmission, a special reverse gear shaft is arranged. The arrangement of the reverse gear shaft not only increases the arrangement space, but also increases the weight and cost of the transmission. In addition, the existing seven-speed double clutch transmission has a complicated reverse gear transmission path and a large number of engaging gears, which is disadvantageous to the compactness and noise performance requirements of transmission space arrangement, thus affecting the weight reduction and miniaturization of the transmission, as well as the economy and driving comfort of the entire vehicle.

SUMMARY

The technical problem to be solved by the present disclosure is to provide a seven-speed double clutch transmission and a vehicle, aiming at the defects that the existing seven-speed double clutch transmission has a complicated reverse gear transmission path and a large number of engaging gears, which is disadvantageous to the compactness requirement of transmission space arrangement.

In order to solve the above technical problem, in one aspect, the embodiment of the present disclosure provides a seven-speed double clutch transmission, which may include:

an outer input shaft and an inner input shaft coaxially nested together, the inner input shaft being connected with a power source through a first clutch, the outer input shaft being connected with the power source through a second clutch, a 4/6-speed driving gear and a 2-speed driving gear being sequentially fixed on the outer input shaft in a direction away from the power source, and a 1-speed driving gear, a 3-speed driving gear and a 5/7-speed driving gear being sequentially fixed on the inner input shaft in a direction away from the power source;

a first output shaft and a second output shaft, the first output shaft, the second output shaft and the outer input shaft being spaced apart in parallel, a 4-speed driven gear, a 2-speed driven gear, a 1-speed driven gear and a 5-speed driven gear being sequentially fixed on the first output shaft in a direction away from the power source, a 6-speed driven gear, a reverse gear, a reverse gear synchronizer, a 3-speed driven gear and a 7-speed driven gear being sequentially fixed on the second output shaft in a direction away from the power source, the 4-speed driven gear, the 2-speed driven gear, the 1-speed driven gear and the 5-speed driven gear being sleeved on the first output shaft, the 6-speed driven gear, the reverse gear, the reverse gear synchronizer, the 3-speed driven gear and the 7-speed driven gear being sleeved on the second output shaft, the reverse gear synchronizer being configured to control the engagement and disengagement of the reverse gear and the 3-speed driven gear, the 1-speed driving gear engaging with the 1-speed driven gear, the 2-speed driving gear engaging with the 2-speed driven gear, the reverse gear engaging with the 2-speed driven gear, the 3-speed driving gear engaging with the 3-speed driven gear, the 4/6-speed driving gear simultaneously engaging with the 4-speed driven gear and the 6-speed driven gear, and the 5/7-speed driving gear simultaneously engaging with the 5-speed driven gear and the 7-speed driven gear; and a forward gear synchronization device, the forward gear synchronization device being configured to control the engagement and disengagement of all forward driven gears with an output shaft where they are located.

In the seven-speed double clutch transmission of the embodiment of the present disclosure, even-speed driving gears (i.e., 4/6-speed driving gear and 2-speed driving gear) are arranged on the outer input shaft, and odd-speed driving gears (i.e., 1-speed driving gear, 3-speed driving gear and 5/7-speed driving gear) are arranged on the inner input shaft. The 1-speed, 2-speed, 4-speed and 5-speed driven gears are arranged on the first output shaft; the 3-speed driven gear, the 6-speed driven gear, the 7-speed driven gear and the reverse gear are arranged on the second output shaft; during the gear arrangement, the 1-speed gear is arranged in the middle of a transmission system, and the higher-speed gears are arranged at the rear end of the transmission system, which facilitates the design of a smaller radial space at the rear end of a transmission housing, makes a box body designed to be more compact, and can also provide a large arrangement space for stringers and axle shafts of the entire vehicle, thereby improving the performance of the entire vehicle. In addition, a reverse gear shaft is eliminated, reverse gear transmission power may be transmitted by using the first output shaft (as an idler shaft), the 3-speed driving and driven gears, the 2-speed driving gear and the second-speed driven gear as transmission components of a reverse gear, a dedicated reverse gear shaft is saved, it has a large contribution in weight and cost, and a center distance between the input shaft and the two output shafts may be designed to be smaller and more compact in structure. Furthermore, a reverse gear transmission path is simple, the number of gear engagements is reduced, and the transmission is more stable, which is beneficial to the noise control of the double clutch transmission.

In an embodiment, the reverse gear synchronizer may control the reverse gear to engage with the 3-speed driven gear, and the forward gear synchronization device may control other forward driven gears than the 2-speed driven gear to be separated from the output shaft where they are located, so as to implement a reversing function of the seven-speed double clutch transmission.

In this case, power of the reverse gear provided by the power source may be transmitted to an output end via the first clutch, the inner input shaft, the 3-speed driving gear, the 3-speed driven gear, the reverse gear synchronizer, the reverse gear, the 2-speed driven gear and the first output shaft.

In an embodiment, a 3/reverse gear needle bearing for supporting, and mounting the reverse gear and the 3-speed driven gear may be disposed at a position, opposite to the reverse gear and the 3-speed driven gear, on the second output shaft, a reverse gear bearing may be disposed in an inner ring of the reverse gear, a reverse gear bush may be disposed in an inner ring of the reverse gear bearing, and the reverse gear bush may be located between the 3/reverse gear needle bearing and the reverse gear bearing.

In an embodiment, the periphery of the second output shaft may be sequentially sleeved with a reverse gear face bearing, the 3/reverse gear needle bearing, a 3-speed driven gear face bearing and a 3-speed driven gear spacer bush in a direction away from the power source, a side of the reverse gear bush close to the power source may be limited by the reverse gear face bearing, and a side of the 3-speed driven gear away from the power source may be limited by the 3-speed driven gear face bearing and the 3-speed driven gear spacer bush.

In an embodiment, when being subject to an axial force in a direction close to the power source, the 3-speed driven gear may be limited by an end face of the reverse gear bush away from the power source.

In an embodiment, the reverse gear bush may include a reverse gear supporting portion and a reverse gear limiting portion, wherein the reverse gear supporting portion is disposed between the reverse gear bearing and the 3/reverse gear needle bearing, the reverse gear supporting portion is configured to support the reverse gear up radially, the reverse gear limiting portion is disposed between the reverse gear and the reverse gear face bearing, and the reverse gear limiting portion is configured to limit the axial movement of the reverse gear.

In an embodiment, the reverse gear bush may be L-shaped, and the reverse gear supporting portion and the reverse gear limiting portion may be vertical to each other.

In an embodiment, the reverse gear supporting portion may be further radially provided with a through oil guide hole, wherein one end of the oil guide hole is connected to the 3/reverse gear needle bearing, and the other end of the oil guide hole is connected to the reverse gear bearing.

In an embodiment, the reverse gear bush may further include a reverse gear face bearing supporting portion, wherein the reverse gear face bearing supporting portion limits the axial displacement of the reverse gear face bearing, and the reverse gear supporting portion and the reverse gear face bearing supporting portion are located on both sides of the reverse gear limiting portion respectively.

In an embodiment, a gear hub of the reverse gear synchronizer may be connected to the reverse gear by a spline or welding.

In an embodiment, the forward gear synchronization device may include:

a 2/4-speed synchronizer disposed on the first output shaft and located between the 2-speed driven gear and the 4-speed driven gear, the 2/4-speed synchronizer being configured to control the engagement and disengagement of the 2-speed driven gear and the first output shaft and to control the engagement and disengagement of the 4-speed driven gear and the first output shaft;

a 1/5-speed synchronizer disposed on the first output shaft and located between the 1-speed driven gear and the 5-speed driven gear, the 1/5-speed synchronizer being configured to control the engagement and disengagement of the 1-speed driven gear and the first output shaft and to control the engagement and disengagement of the 5-speed driven gear and the first output shaft;

a 6-speed synchronizer disposed on the second output shaft and located between the 6-speed driven gear and the reverse gear, the 6-speed, synchronizer being configured to control the engagement and disengagement of the 6-speed driven gear and the second output shaft; and a 3/7-speed synchronizer disposed on the second output shaft and located between the 3-speed driven gear and the 7-speed driven gear, the 3/7-speed synchronizer being configured to control the engagement and disengagement of the 3-speed driven gear and the second output shaft and to control the engagement and disengagement of the 7-speed driven, gear and the second output shaft.

In an embodiment, a gear hub of the 2/4-speed synchronizer and a gear hub of the 1/5-speed synchronizer may be connected to the first output shaft by a spline, and a gear hub of the 6-speed synchronizer and a gear hub of the 3/7-speed synchronizer may be connected to the second output shaft by a spline.

In an embodiment, the 4/6-speed driving gear, the 4-speed driven gear and the 6-speed driven gear may form a coplanar gear set, the 2-speed driving gear, the 2-speed driven gear and the reverse gear may form a coplanar gear set, and the 5/7-speed driving gear, the 5-speed driven gear and the 7-speed driven gear may form a coplanar gear set.

In an embodiment, a first main reduction gear may be disposed on the first output shaft in a direction away from the power source sequentially, a second main reduction gear may be disposed on the second output shaft in a direction away from the power source sequentially, the first main reduction gear may be fixed on the first output shaft, the second main reduction gear may be fixed on the second output shaft, the first main reduction gear and the second main reduction gear may simultaneously engage with a gear ring of a differential, and the first main reduction gear, the second main reduction gear and the gear ring of the differential may form a coplanar gear set.

In an embodiment, the 4/6-speed driving gear and the 2-speed driving gear may be fixed on the outer input shaft by welding, spline connection, interference press fitting or direct integration on the shaft.

The 1-speed driving gear, the 3-speed driving gear and the 5/7-speed driving gear may be fixed on the inner input, shaft by welding, spline connection, interference press fitting or direct integration on the shaft.

In addition, the embodiment of the present disclosure also provides a vehicle, which may include the above seven-speed double clutch transmission.

The reference numerals in the drawings of the specification are as follows: 1, outer input shaft; 2, second main reduction gear; 3, 6-speed driven gear; 4, 6-speed synchronizer; 5, reverse gear; 6, reverse gear synchronizer; 7, 3-speed driven gear; 8, 3/7-speed synchronizer; 9, second output shaft; 10, 7-speed driven gear; 11, 1-speed driving gear; 12, 3-speed driving gear; 13, 5/7-speed driving gear; 14 inner input shaft; 15, first output shaft; 16, 5-speed driven gear; 17, 1/5-speed synchronizer; 18, 1-speed driven gear; 19, 2-speed driven gear; 20, 2/4-speed synchronizer; 21, differential; 22, gear ring; 23, 4-speed driven gear; 24, first main reduction gear; 25, 2-speed driving gear; 26, 4/6-speed driving gear; 27, power source; 28, second clutch; 29, first clutch; 30, 3-speed driven gear spacer bush; 31, 3-speed driven gear face bearing; 32, 3/reverse gear needle bearing; 33, reverse gear bearing; 34, reverse gear bush; 35, reverse gear face bearing.

DETAILED DESCRIPTION OF THE EMBODIMENTS

In order to make the technical problems, technical solutions and beneficial effects of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

Figure 1:
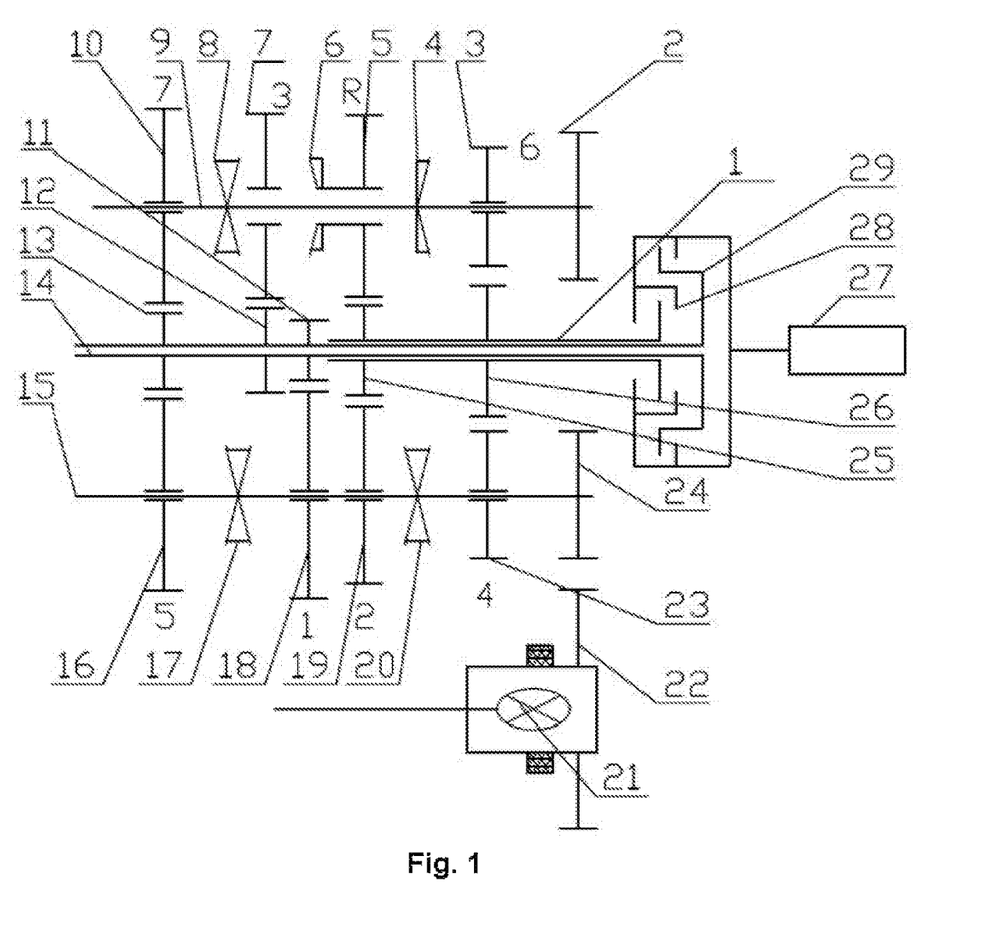
FIG. 1 is a frame diagram of a seven-speed double clutch transmission according to an embodiment of the present disclosure.

As shown in FIG. 1, a seven-speed double clutch transmission provided by the embodiment of the present disclosure includes; an outer input shaft 1, an inner input shaft 14, a first output shaft 15, a second output shaft 9, and a forward gear synchronization device.

The outer input shaft 1 and the inner input shaft 14 are coaxially nested together, the inner input shaft 14 is connected with a power source 27 through a first clutch 29, the outer input shaft 1 is connected with the power source 27 through a second clutch 28, a 4/6-speed driving gear 26 and a 2-speed driving gear 25 are sequentially fixed on the outer input shaft 1 in a direction away from the power source 27, and a 1-speed driving gear 11, a 3-speed driving gear 12 and a 5/7-speed driving gear 13 are sequentially fixed on the inner input shaft 14 in a direction away from the power source 27.

The first output shaft 15, the second output shaft 9 and the outer input shaft 1 are spaced apart in parallel, a first main reduction gear 24, a 4-speed driven gear 23, a 2-speed driven gear 19, a 1-speed driven gear 18 and a 5-speed driven gear 16 are sequentially disposed on the first output shaft 15 in a direction away from the power source 27, a second main reduction gear 2, a 6-speed driven gear 3, a reverse gear 5, a reverse gear synchronizer 6, a 3-speed driven gear 7 and a 7-speed driven gear 10 are sequentially disposed on the second output shaft 9 in a direction away from the power source 27, the first main reduction gear 24 is fixed on the first output shaft 15, the second main reduction gear 2 is fixed on the second output shaft 9, the 4-speed driven gear 23, the 2-speed driven gear 19, the 1-speed driven gear 18 and the 5-speed driven gear 16 are sleeved on the first output shaft 15, the 6-speed driven gear 3, the reverse gear 5, the reverse gear synchronizer 6, the 3-speed driven gear 7 and the 7-speed driven gear 10 are sleeved on the second output shaft 9, the reverse gear synchronizer 6 is configured to control the engagement and disengagement of the reverse gear 5 and the 3-speed driven gear 7, the first main reduction gear 24 and the second main reduction gear 2 simultaneously engage with a gear ring 22 of a differential 21, the 1-speed driving gear 11 engages with the 1-speed driven gear 18, the 2-speed driving gear 25 engages with the 2-speed driven gear 19, the reverse gear (5) engages with the 2-speed driven gear (19), the 3-speed driving gear 12 engages with the 3-speed driven gear 7, the 4/6-speed driving gear 26 simultaneously engages with the 4-speed driven gear 23 and the 6-speed driven gear 3, and the 5/7-speed driving gear 13 simultaneously engages with the 5-speed driven gear 16 and the 7-speed driven gear 10.

The forward gear synchronization device is configured to control the engagement and disengagement of all forward driven gears with an output shaft where they are located. Here, the forward driven gear refers to other driven gears than the reverse gear 5, namely the 1-speed driven gear 18, the 2-speed driven gear 19, the 3-speed driven gear 7, the 4-speed driven gear 23, the 5-speed driven gear 16, the 6-speed driven gear 3, and the 7-speed driven gear 10.

The power source 27 may be, for example, an engine, a motor or a hybrid power assembly that is a combination of an engine and a motor. The first clutch 29 and the second clutch 28 form a double clutch.

In the seven-speed double clutch transmission of the embodiment of the present disclosure, even-speed driving gears (i.e., 4/6-speed driving gear 26 and 2-speed driving gear 25) are arranged on the outer input shaft 1, and odd-speed driving gears (i.e., 1-speed driving gear 11, 3-speed driving gear 12 and 5/7-speed driving gear 13) are arranged on the inner input shaft 14. The 1-speed, 2-speed, 4-speed and 5-speed driven gears are arranged on the first output shaft 15; the 3-speed driven gear, the 6-speed driven gear, the 7-speed driven gear and the reverse gear are arranged on the second output shaft 9; during the gear arrangement, the 1-speed gear is arranged in the middle of a transmission system, and the higher-speed gears are arranged at the rear end of the transmission system, which facilitates the design of a smaller radial space at the rear end of a transmission housing, makes a box body designed to be more compact, and can also provide a large arrangement space for stringers and axle shafts of the entire vehicle, thereby improving the performance of the entire vehicle. In addition, a reverse gear shaft is eliminated, reverse gear transmission power may be transmitted by using the first output shaft 15 (as an idler shaft), the 3-speed driving and driven gears, the 2-speed driving gear 25 and the second-speed driven gear 19 as transmission components of a reverse gear, a dedicated reverse gear shaft is saved, it has a large contribution in weight and cost, and a center distance between the input shaft and the two output shafts may be designed to be smaller and more compact in structure. Furthermore, a reverse gear transmission path is simple, the number of gear engagements is reduced, and the transmission is more stable, which is beneficial to the noise control of the double clutch transmission.

In addition, 4 and 6 gears share a 4/6-speed driving gear 26, and 5 and 7 gears share a 5/7-speed driving gear 13 to reduce the use of the driving gear, shorten the axial length of the transmission, and reduce the weight of the transmission. In an embodiment, the reverse gear synchronizer 6 controls the reverse gear 5 to engage with the 3-speed driven gear 7, and the forward gear synchronization device controls other forward driven gears than the 2-speed driven gear to be separated from the output shaft where they are located, so as to implement a reversing function of the seven-speed double clutch transmission. In this case, power of the reverse gear provided by the power source 27 is transmitted via the first clutch 29, the inner input shaft 14, the 3-speed driving gear 12, the 3-speed driven gear 7, the reverse gear synchronizer 6, the reverse gear 5, the 2-speed driving gear 25, the 2-speed driven gear 19, the first output shaft 15, the first main reduction gear 24, and the differential 21.

Moreover, the frequency of use of the first gear and the reverse gear is relatively high, when the power source 27 transmits the power to the first gear and the reverse gear, the torque changes greatly, and the frictional wear of the clutch is relatively large; if the same clutch is used to control the power interruption of the first, gear and the reverse gear, the frictional wear of the clutch will be aggravated. Therefore, the present disclosure controls the power on and off of the first gear and the reverse gear by the second clutch 28 and the first clutch 29 respectively, which is advantageous for prolonging the service lives of the second clutch 28 and the first clutch 29.

In an embodiment, the outer input shaft 1, the inner input shaft 14, the first output shaft 15 and the second output shaft 9 are respectively rotatably supported on the transmission housing by bearings to achieve stable support of the respective shafts.

In an embodiment, the 4/6-speed driving gear 26, the 4-speed driven gear 23 and the 6-speed driven gear 3 form a coplanar gear set, the 2-speed driving gear 25, the 2-speed driven gear 19 and the reverse gear 5 form a coplanar gear set, the 5/7-speed driving gear 13, the 5-speed driven gear 16 and the 7-speed driven gear 10 form a coplanar gear set, and the first main reduction gear 24, the second main reduction gear 2 and the gear ring 22 of the differential 21 form a coplanar gear set. By constructing the coplanar gear set, the axial size of the transmission can be reduced and the volume of the transmission can be reduced.

In an embodiment, the 4/6-speed driving gear 26 and the 2-speed driving gear 25 are fixed on the inner input shaft 1 by welding, spline connection, interference press fitting or direct integration on the shaft. The 1-speed driving gear 11, the 3-speed driving gear 12 and the 5/7-speed driving gear 13 are fixed on the inner input shaft 14 by welding, spline connection, interference press fitting or direct integration on the shaft.

In an embodiment, the forward gear synchronization device includes: a 2/4-speed synchronizer 20, a 1/5-speed synchronizer 17, a 6-speed synchronizer 4, and a 3/7-speed synchronizer 8.

The 2/4-speed synchronizer 20 is disposed on the first output shaft 15 and located between the 2-speed driven gear 19 and the 4-speed driven gear 23, and the 2/4-speed synchronizer 20 is configured to control the engagement and disengagement of the 2-speed driven gear 19 and the first output shaft 15 and to control the engagement and disengagement of the 4-speed driven gear 23 and the first output shaft 15.

The 1/5-speed synchronizer 17 is disposed on the first output shaft 15 and located between the 1-speed driven gear 18 and the 5-speed driven gear 16, and the 1/5-speed synchronizer 17 is configured to control the engagement and disengagement of the 1-speed driven gear 18 and the first output shaft 15 and to control the engagement and disengagement of the 5-speed driven gear 16 and the first output shaft 15.

The 6-speed synchronizer 4 is disposed on the second output shaft 9 and located between the 6-speed driven gear 3 and the reverse gear 5, and the 6-speed synchronizer 4 is configured to control the engagement and disengagement of the 6-speed driven gear 3 and the second output shaft 9.

The 3/7-speed synchronizer 8 is disposed on the second output shaft 9 and located between the 3-speed driven gear 7 and the 7-speed driven gear 10, and the 3/7-speed synchronizer 8 is configured to control the engagement and disengagement of the 3-speed driven gear 7 and the second output shaft 9 and to control the engagement and disengagement of the 7-speed driven gear 10 and the second output shaft 9.

In an embodiment, a gear, hub of the reverse gear synchronizer 6 is connected to the reverse gear 5 by a spline or welding. A gear hub of the 2/4-speed synchronizer 20 and a gear hub of the 1/5-speed synchronizer 17 are connected to the first output shaft 15 by a spline, and a gear hub of the 6-speed synchronizer 4 and a gear hub of the 3/7-speed synchronizer 8 are connected to the second output shaft 9 by a spline.

Figure 2:
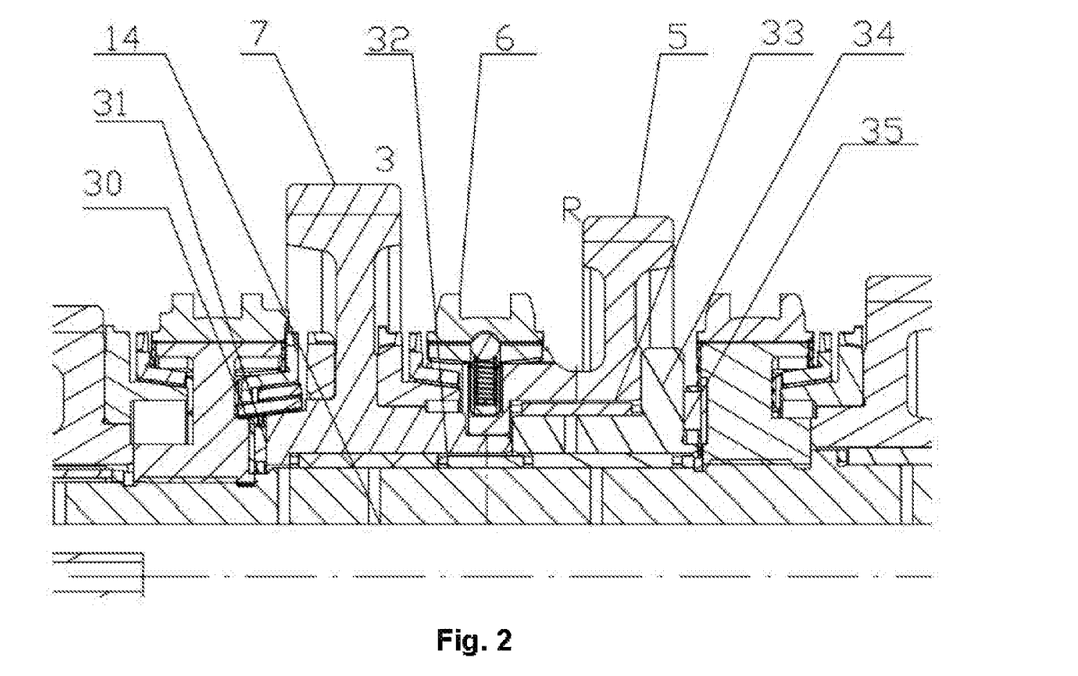
FIG. 2 is a partial position section view of a 3-speed driven gear and a reverse gear according to an embodiment of the present disclosure.

In an embodiment, as shown in FIG. 2, a 3/reverse gear needle bearing 32 for supporting and mounting the reverse gear 5 and the 3-speed driven gear 7 is disposed at a position, opposite to the reverse gear 5 and the 3-speed driven gear 7, on the second output shaft 9. A reverse gear bearing 33 is disposed in an inner ring of the reverse gear 5, and a reverse gear bush 34 is disposed in an inner ring of the reverse gear bearing 33. The periphery of the second output shaft 9 is sequentially sleeved with a reverse gear face bearing 35, the 3/reverse gear needle bearing 32, a 3-speed driven gear face bearing 31 and a 3-speed driven gear spacer bush 30 in a direction away from the power source 27. The 3/reverse gear needle bearing 32 simultaneously supports the reverse gear bush 34 and the 3-speed driven gear 7. A side of the reverse gear bush 34 close to the power source 27 is limited by the reverse gear face bearing 35, and a side of the 3-speed driven gear 7 away from the power source 27 is limited by the 3-speed driven gear face bearing 31 and the 3-speed driven gear spacer bush 30. When being subject to a rightward axial force in FIG. 2 (in a direction close to the power source 27), the 3-speed driven gear 7 is limited by a left end face of the reverse gear bush 34 (an end face away from the power source 27). In this way, the radial clearance of the 3/reverse gear needle bearing 32 can be reduced, which is advantageous for smooth transmission and makes the reverse gear difficult to disengage.

In an embodiment, the reverse gear bush 34 is press-fitted into the inner ring of the reverse gear bearing 33. The reverse gear bush 34 includes a reverse gear supporting portion and a reverse gear limiting portion. The reverse gear bush 34 is L-shaped, and the reverse gear supporting portion and the reverse gear limiting portion are vertical to each other. The reverse gear supporting portion is disposed between the reverse gear bearing 33 and the 3/reverse gear needle bearing 32, and the reverse gear supporting portion is configured to support the reverse gear 5 up radially. The reverse gear limiting portion is disposed between the reverse gear 5 and a reverse gear face bearing 35, and the reverse gear limiting portion is configured to limit the axial movement of the reverse gear 5. Preferably, the reverse gear supporting portion is further radially provided with a through oil guide hole, wherein one end of the oil guide hole is connected to the 3/reverse gear needle bearing 32, and the other end of the oil guide hole is connected to the reverse gear bearing 33. In addition, the reverse gear bush 34 further includes a reverse gear face bearing supporting portion, wherein the reverse gear face bearing supporting portion limits the axial displacement of the reverse gear face bearing. The reverse gear supporting portion and the reverse gear face bearing supporting portion are located on both sides of the reverse gear limiting portion respectively.

By controlling different working states of the reverse gear synchronizer 6 and the forward gear synchronization device (2/4-speed synchronizer, 1/5-speed synchronizer, 6-speed synchronizer and 3/7-speed synchronizer), seven forward gears and one reverse gear can be realized to build a seven-speed double clutch transmission.

The power transmission route of the double clutch transmission of the present embodiment when working in each gear position will be described below with reference to FIG. 1 (an engine is selected as the power source 27):

First-speed power transmission route:

First, the 1/5-speed synchronizer 17 and the 1-speed driven gear 18 engage (i.e., the 1-speed driven gear 18 engages with the first output shaft 15), the first clutch 29 is closed, and the torque of the engine is transmitted to the 1-speed driving gear 11 of the inner input shaft 14 through the first clutch 29 and transmitted to the 1-speed driven gear 18 via the 1-speed driving gear 11. The 1-speed driven gear 18 and the 1/5-speed synchronizer (17) transmit the torque to the first main reduction gear 24 on the first output shaft 15, the torque passes through the gear ring 22 of the differential 21, and power is finally output by the differential 21.

Second-speed power transmission route:

The 2/4-speed synchronizer 20 and the 2-speed driven gear 19 engage (i.e., the 2-speed driven gear 19 engages with the first output shaft 15), the second clutch 28 is closed, and the torque of the engine is transmitted to the outer input shaft 1 through the second, clutch 28, transmitted to the 2-speed driven gear 19 via the 2-speed driving gear 25 fixed on the outer input shaft 1, and then transmitted to the first main reduction gear 24 on the first output shaft 15 by engagement of the 2-speed driven gear 19 and the 2/4-speed synchronizer 20, the torque passes through the gear ring 22 of the differential 21, and power is finally output by the differential 21.

Third-speed power transmission route:

The 3/7-speed synchronizer 8 and the 3-speed driven gear 7 engage (i.e., the 3-speed driven gear 7 engages with the second output shaft 9), the first clutch 29 is closed, and the torque of the engine is transmitted to the 3-speed driving gear 12 of the inner input shaft 14 through the first clutch 29 and transmitted to the 3-speed driven gear 7 via the 3-speed driving gear 12. The 3-speed driven gear 7 and the 3/7-speed synchronizer 8 transmit the torque to the second main reduction gear 2 on the second output shaft 9, the torque passes through the gear ring 22 of the differential 21, and power is finally output by the differential 21.

Fourth-speed power transmission route:

The 2/4-speed synchronizer 20 and the 4-speed driven gear 23 engage (i.e., the 4-speed driven gear 7 engages with the first output shaft 15), the second clutch 28 is closed, and the torque of the engine is transmitted to the outer input shaft 1 through the second clutch 28, transmitted to the 4-speed driven gear 23 via the 4/6-speed driving gear 26 fixed on the outer input shaft 1, and then transmitted to the first main reduction gear 24 on the first output shaft 15 by engagement of the 4-speed driven gear 23 and the 2/4-speed synchronizer 20, the torque passes through the gear ring 22 of the differential 21, and power is finally output by the differential 21.

Fifth-speed power transmission route:

The 1/5-speed synchronizer 17 and the 5-speed driven gear 16 engage (i.e., the 5-speed driven gear 16 engages with the first output shaft 15), the first clutch 29 is closed, and the torque of the engine is transmitted to the 5/7-speed driving gear 13 of the inner input shaft 14 through the first clutch 29 and transmitted to the 5-speed driven gear 16 via the 5/7-speed driving gear 13. The 5-speed driven gear 16 and the 1/5-speed synchronizer 17 transmit the torque to the first main reduction gear 24 on the first output shaft 15, the torque passes through the gear ring 22 of the differential 21, and power is finally output by the differential 21.

Sixth-speed power transmission route:

The 6-speed synchronizer 4 and the 6-speed driven gear 3 engage (i.e., the 6-speed driven gear 3 engages with the second output shaft 9), the second clutch 28 is closed, and the torque of the engine is transmitted to the outer input shaft 1 through the second clutch 28, transmitted to the 6-speed driven gear 3 via the 4/6-speed driving gear 26 fixed on the outer input shaft 1, and then transmitted to the second main reduction gear 2 on the second output shaft 9 by engagement of the 6-speed driven gear 3 and the 6-speed synchronizer 4, the torque passes through the gear ring 22 of the differential 21, and power is finally output by the differential 21.

Seventh-speed power transmission route:

The 3/7-speed synchronizer 8 and the 7-speed driven gear 10 engage (i.e., the 7-speed driven gear 10 engages with the second output shaft 9), the first clutch 29 is closed, and the torque of the engine is transmitted to the 5/7-speed driving gear 13 of the inner input shaft 14 through the first clutch 29 and transmitted to the 7-speed driven gear 10 via the 5/7-speed driving gear 13. The 7-speed driven gear 10 and the 3/7-speed synchronizer 8 engage to transmit the torque to the second main reduction gear 2 on the second output shaft 9, the torque passes through the gear ring 22 of the differential 21, and power is finally output by the differential 21.

Reverse gear power transmission route:

The 2/4-speed synchronizer 20 and the 2-speed driven gear 19 engage (i.e., the 2-speed driven gear 19 engages with the first output shaft 15), the reverse gear synchronizer 6 and the 3-speed driven gear 7 engage (i.e., the reverse gear 5 and the 3-speed driven gear 7 are integrated by the reverse gear synchronizer 6), the first clutch 29 is closed, and the torque of the engine is transmitted to the outer input shaft 14 through the first clutch 29, transmitted to the 3-speed driven gear 7 via the 3-speed driving gear 12 fixed on the inner input shaft 14, transmitted to the reverse gear 5 by engagement of the 3-speed driven gear 7 and the reverse gear synchronizer 6, transmitted to the 2-speed driven gear 19 by the reverse gear 5, and then transmitted to the first main reduction gear 24 on the first output shaft 15 by engagement of the 2-speed driven gear 19 and the 2/4-speed synchronizer 20, the torque passes through the gear ring 22 of the differential 21, and power is finally output by the differential 21.

The shifting process of the seven-speed double clutch transmission of the above embodiment will be described below by taking only the third gear as an example. The shifting process for other gears is similar.

The 3-speed reverse gear shifting process is as follows: in the third gear, the 3/7-speed synchronizer 8 and the 3-speed driven gear 7 engage, the first clutch 29 is closed, and the second clutch 28 is opened. After a control system of the double clutch transmission issues a 3-speed reverse gear shifting command, a shifting actuator combines the 2/4 speed synchronizer 20 and the 2-speed driven gear 19 in advance, at which time the second clutch 28 is still open, i.e., neither the second clutch 28 nor the outer input shaft 1 transmits power. As the shifting process continues, the first clutch 29 is gradually opened while the second clutch 28 is gradually closed, during which time there is always a clutch engagement and no torque interruption occurs. After the first clutch 29 is fully opened and the second clutch 28 is fully closed, the shifting process ends. At this time, the first clutch 29 is open, i.e., neither the first clutch 29 nor the inner input shaft 14 transmits power, and the torque of the engine is transmitted to the 2-speed driven gear 19 via the second clutch 28. The 2-speed driven gear 19 and the 2/4-speed synchronizer 20 transmit the torque to the first main reduction gear 24 on the first output shaft 15, the torque passes through the gear ring 22 of the differential 21, and power is finally output by the differential 21.

In addition, an embodiment of the present disclosure also provides a vehicle, which includes the seven-speed double clutch transmission of the above embodiment.

The above are only the exemplary embodiments of the present disclosure and are not intended to limit the present disclosure. Any modifications, equivalent replacements, improvements and the like, made within the principle of the present disclosure shall fall within the scope of protection of the present disclosure.

What is claimed is:

1. A seven-speed double clutch transmission, comprising:

an outer input shaft (1) and an inner input shaft (14) coaxially nested together, the inner input shaft (14) being connected with a power source (27) through a first clutch (29), the outer input shaft (1) being connected with the power source (27) through a second clutch (28), a 4/6-speed driving gear (26) and a 2-speed driving gear (25) being sequentially fixed on the outer input shaft (1) in a direction away from the power source (27), and a 1-speed driving gear (11), a 3-speed driving gear (12) and a 5/7-speed driving gear (13) being sequentially fixed on the inner input shaft (14) in a direction away from the power source (27);

a first output shaft (15) and a second output shaft (9), the first output shaft (15), the second output shaft (9) and the outer input shaft (1) being spaced apart in parallel, a 4-speed driven gear (23), a 2-speed driven gear (19), a 1-speed driven gear (18) and a 5-speed driven gear (16) being sequentially disposed on the first output shaft (15) in a direction away from the power source (27), a 6-speed driven gear (3), a reverse gear (5), a reverse gear synchronizer (6), a 3-speed driven gear (7) and a 7-speed driven gear (10) being sequentially disposed on the second output shaft (9) in a direction away from the power source (27), the 4-speed driven gear (23), the 2-speed driven gear (19), the 1-speed driven gear (18) and the 5-speed driven gear (16) being sleeved on the first output shaft (15), the 6-speed driven gear (3), the reverse gear (5), the reverse gear synchronizer (6), the 3-speed driven gear (7) and the 7-speed driven gear (10) being sleeved on the second output shaft (9), the reverse gear synchronizer (6) being configured to control the engagement and disengagement of the reverse gear (5) and the 3-speed driven gear (7), the 1-speed driving gear (11) engaging with the 1-speed driven gear (18), the 2-speed driving gear (25) engaging with the 2-speed driven gear (19), the reverse gear (5) engaging with the 2-speed driven gear (19), the 3-speed driving gear (12) engaging with the 3-speed driven gear (7), the 4/6-speed driving gear (26) simultaneously engaging with the 4-speed driven gear (23) and the 6-speed driven gear (3), and the 5/7-speed driving gear (13) simultaneously engaging with the 5-speed driven gear (16) and the 7-speed driven gear (10); and a forward gear synchronization device, the forward gear synchronization device being configured to control the engagement and disengagement of all forward driven gears with an output shaft where they are located;

wherein the reverse gear synchronizer (6) controls the reverse gear (5) to engage with the 3-speed driven gear (7), and the forward gear synchronization device controls other forward driven gears than the 2-speed driven gear to be separated from the output shaft where they are located, so as to implement a reversing function of the seven-speed double clutch transmission; and power of the reverse gear provided by the power source (27) is transmitted to an output end via the first clutch (29), the inner input shaft (14), the 3-speed driving gear (12), the 3-speed driven gear (7), the reverse gear synchronizer (6), the reverse gear (5), the 2-speed driven gear (19) and the first output shaft (15).

2. The seven-speed double clutch transmission as claimed in claim 1, wherein a 3/reverse gear needle bearing (32) for supporting and mounting the reverse gear (5) and the 3-speed driven gear (7) is disposed at a position, opposite to the reverse gear (5) and the 3-speed driven gear (7), on the second output shaft (9), a reverse gear bearing (33) is disposed in an inner ring of the reverse gear (5), a reverse gear bush (34) is disposed in an inner ring of the reverse gear bearing (33), and the reverse gear bush (34) is located between the 3/reverse gear needle bearing (32) and the reverse gear bearing (33).

3. The seven-speed double clutch transmission as claimed in claim 2, wherein the periphery of the second output shaft (9) is sequentially sleeved with a reverse gear face bearing (35), the 3/reverse gear needle bearing (32), a 3-speed driven gear face bearing (31) and a 3-speed driven gear spacer bush (30) in a direction away from the power source (27), a side of the reverse gear bush (34) close to the power source (27) is limited by the reverse gear face bearing (35), and a side of the 3-speed driven gear (7) away from the power source (27) is limited by the 3-speed driven gear face bearing (31) and the 3-speed driven gear spacer bush (30).

4. The seven-speed double clutch transmission as claimed in claim 3, wherein when being subject to an axial force in a direction close to the power source (27), the 3-speed driven gear (7) is limited by an end face of the reverse gear bush (34) away from the power source (27).

5. The seven-speed double clutch transmission as claimed in claim 3, wherein the reverse gear bush (34) comprises a reverse gear supporting portion and a reverse gear limiting portion, the reverse gear supporting portion is disposed between the reverse gear bearing (33) and the 3/reverse gear needle bearing (32), the reverse gear supporting portion is configured to support the reverse gear (5) up radially, the reverse gear limiting portion is disposed between the reverse gear (5) and the reverse gear face bearing (35), and the reverse gear limiting portion is configured to limit the axial movement of the reverse gear (5).

6. The seven-speed double clutch transmission as claimed in claim 5, wherein the reverse gear bush (34) is L-shaped, and the reverse gear supporting portion and the reverse gear limiting portion are vertical to each other.

7. The seven-speed double clutch transmission as claimed in claim 5, wherein the reverse gear supporting portion is further radially provided with a through oil guide hole, one end of the oil guide hole is connected to the 3/reverse gear needle bearing (32), and the other end of the oil guide hole is connected to the reverse gear bearing (33).

8. The seven-speed double clutch transmission as claimed in claim 5, wherein the reverse gear bush (34) further comprises a reverse gear face bearing supporting portion, the reverse gear face bearing supporting portion limits the axial displacement of the reverse gear face bearing, and the reverse gear supporting portion and the reverse gear face bearing supporting portion are located on both sides of the reverse gear limiting portion respectively.

9. The seven-speed double clutch transmission as claimed in claim 1, wherein a gear hub of the reverse gear synchronizer (6) is connected to the reverse gear (5) by a spline or welding.

10. The seven-speed double clutch transmission as claimed in claim 1, wherein the forward gear synchronization device comprises:
a 2/4-speed synchronizer (20) disposed on the first output shaft (15) and located between the 2-speed driven gear (19) and the 4-speed driven gear (23), the 2/4-speed synchronizer (20) being configured to control the engagement and disengagement of the 2-speed driven gear (19) and the first output shaft (15) and to control the engagement and disengagement of the 4-speed driven gear (23) and the first output shaft (15);
a 1/5-speed synchronizer (17) disposed on the first output shaft (15) and located between the 1-speed driven gear (18) and the 5-speed driven gear (16), the 1/5-speed synchronizer (17) being configured to control the engagement and disengagement of the 1-speed driven gear (18) and the first output shaft (15) and to control the engagement and disengagement of the 5-speed driven gear (16) and the first output shaft (15);
a 6-speed synchronizer (4) disposed on the second output shaft (9) and located between the 6-speed driven gear (3) and the reverse gear (5), the 6-speed synchronizer (4) being configured to control the engagement and disengagement of the 6-speed driven gear (3) and the second output shaft (9); and
a 3/7-speed synchronizer (8) disposed on the second output shaft (9) and located between the 3-speed driven gear (7) and the 7-speed driven gear (10), the 3/7-speed synchronizer (8) being configured to control the engagement and disengagement of the 3-speed driven gear (7) and the second output shaft (9) and to control the engagement and disengagement of the 7-speed driven gear (10) and the second output shaft (9).

11. The seven-speed double clutch transmission as claimed in claim 10, wherein a gear hub of the 2/4-speed synchronizer (20) and a gear hub of the 1/5-speed synchronizer (17) are connected to the first output shaft (15) by a spline, and a gear hub of the 6-speed synchronizer (4) and a gear hub of the 3/7-speed synchronizer (8) are connected to the second output shaft (9) by a spline.

12. The seven-speed double clutch transmission as claimed in claim 1, wherein the 4/6-speed driving gear (26), the 4-speed driven gear (23) and the 6-speed driven gear (3) form a coplanar gear set, the 2-speed driving gear (25), the 2-speed driven gear (19) and the reverse gear (5) form a coplanar gear set, and the 5/7-speed driving gear (13), the 5-speed driven gear (16) and the 7-speed driven gear (10) form a coplanar gear set.

13. The seven-speed double clutch transmission as claimed in claim 1, wherein a first main reduction gear (24) is disposed on the first output shaft (15) in a direction away from the power source (27) sequentially, a second main reduction gear (2) is disposed on the second output shaft (9) in a direction away from the power source (27) sequentially, the first main reduction gear (24) is fixed on the first output shaft (15), the second main reduction gear (2) is fixed on the second output shaft (9), the first main reduction gear (24) and the second main reduction gear (2) simultaneously engage with a gear ring (22) of a differential (21), and the first main reduction gear (24), the second main reduction gear (2) and the gear ring (22) of the differential (21) form a coplanar gear set.

14. The seven-speed double clutch transmission as claimed in claim 1, wherein the 4/6-speed driving gear (26) and the 2-speed driving gear (25) are fixed on the outer input shaft (1) by welding, spline connection, interference press fitting or direct integration on the shaft; and
the 1-speed driving gear (11), the 3-speed driving gear (12) and the 5/7-speed driving gear (13) are fixed on the inner input shaft (14) by welding, spline connection, interference press fitting or direct integration on the shaft.

15. A vehicle, comprising a seven-speed double clutch transmission, wherein the seven-speed double clutch transmission comprising:
an outer input shaft (1) and an inner input shaft (14) coaxially nested together, the inner input shaft (14) being connected with a power source (27) through a first clutch (29), the outer input shaft (1) being connected with the power source (27) through a second clutch (28), a 4/6-speed driving gear (26) and a 2-speed driving gear (25) being sequentially fixed on the outer input shaft (1) in a direction away from the power source (27), and a 1-speed driving gear (11), a 3-speed driving gear (12) and a 5/7-speed driving gear (13) being sequentially fixed on the inner input shaft (14) in a direction away from the power source (27);
a first output shaft (15) and a second output shaft (9), the first output shaft (15), the second output shaft (9) and the outer input shaft (1) being spaced apart in parallel, a 4-speed driven gear (23), a 2-speed driven gear (19), a 1-speed driven gear (18) and a 5-speed driven gear (16) being sequentially disposed on the first output shaft (15) in a direction away from the power source (27), a 6-speed driven gear (3), a reverse gear (5), a reverse gear synchronizer (6), a 3-speed driven gear (7) and a 7-speed driven gear (10) being sequentially disposed on the second output shaft (9) in a direction away from the power source (27), the 4-speed driven gear (23), the 2-speed driven gear (19), the 1-speed driven gear (18) and the 5-speed driven gear (16) being sleeved on the first output shaft (15), the 6-speed driven gear (3), the reverse gear (5), the reverse gear synchronizer (6), the 3-speed driven gear (7) and the 7-speed driven gear (10) being sleeved on the second output shaft (9), the reverse gear synchronizer (6) being configured to control the engagement and disengagement of the reverse gear (5) and the 3-speed driven gear (7), the 1-speed driving gear (11) engaging with the 1-speed driven gear (18), the 2-speed driving gear (25) engaging with the 2-speed driven gear (19), the reverse gear (5) engaging with the 2-speed driven gear (19), the 3-speed driving gear (12) engaging with the 3-speed driven gear (7), the 4/6-speed driving gear (26) simultaneously engaging with the 4-speed driven gear (23) and the 6-speed driven gear (3), and the 5/7-speed driving gear (13) simultaneously engaging with the 5-speed driven gear (16) and the 7-speed driven gear (10); and
a forward gear synchronization device, the forward gear synchronization device being configured to control the engagement and disengagement of all forward driven gears with an output shaft where they are located;
wherein the reverse gear synchronizer (6) controls the reverse gear (5) to engage with the 3-speed driven gear (7), and the forward gear synchronization device controls other forward driven gears than the 2-speed driven gear to be separated from the output shaft where they are located, so as to implement a reversing function of the seven-speed double clutch transmission; and power of the reverse gear provided by the power source (27) is transmitted to an output end via the first clutch (29), the inner input shaft (14), the 3-speed driving gear (12), the 3-speed driven gear (7), the reverse gear synchronizer (6), the reverse gear (5), the 2-speed driven gear (19) and the first output shaft (15).

16. The vehicle as claimed in claim 15, wherein a 3/reverse gear needle bearing (32) for supporting and mounting the reverse gear (5) and the 3-speed driven gear (7) is disposed at a position, opposite to the reverse gear (5) and the 3-speed driven gear (7), on the second output shaft (9), a reverse gear bearing (33) is disposed in an inner ring of the reverse gear (5), a reverse gear bush (34) is disposed in an inner ring of the reverse gear bearing (33), and the reverse gear bush (34) is located between the 3/reverse gear needle bearing (32) and the reverse gear bearing (33).

17. The vehicle as claimed in claim 16, wherein the periphery of the second output shaft (9) is sequentially sleeved with a reverse gear face bearing (35), the 3/reverse gear needle bearing (32), a 3-speed driven gear face bearing (31) and a 3-speed driven gear spacer bush (30) in a direction away from the power source (27), a side of the reverse gear bush (34) close to the power source (27) is limited by the reverse gear face bearing (35), and a side of the 3-speed driven gear (7) away from the power source (27) is limited by the 3-speed driven gear face bearing (31) and the 3-speed driven gear spacer bush (30).

18. The vehicle as claimed in claim 17, wherein when being subject to an axial force in a direction close to the power source (27), the 3-speed driven gear (7) is limited by an end face of the reverse gear bush (34) away from the power source (27).

* * * * *